Fig. 4.

Patented June 26, 1934

1,964,319

UNITED STATES PATENT OFFICE 1,964,319

ENGRAVING MACHINE

George Gorton and Peter M. Henkes, Racine, Wis.; said Henkes assignor to said Gorton Application July 18, 1932, Serial No. 623,246

32 Claims. (Cl. 90—13.1)

This invention relates to certain engraving machine improvements, and by the term "engraving machines", we include routing, matrix, die sinking, letter cutting, milling, rotary cutter and other machines of the pantograph or other type wherein motion transmitting means is employed to control the lateral movements of the cutter head for reproducing copy or a pattern in scaled relation on or in the work; and the nature and objects of the invention will be readily understood by those skilled in the art in the light of the following explanations and detailed descriptions of the accompanying drawings that illustrate what we at present believe and now consider to be the preferred embodiments or mechanical expressions of our invention from among various other forms, arrangements, embodiments, constructions, and combinations, of which the invention is capable within the spirit and the scope thereof.

One of the primary objects and features of our invention resides in the provision of a design and arrangement in engraving and the like machines of the general types above outlined, by which the operator manipulated controls for the various mechanisms are disposed substantially on the same plane or level and are so relatively located and grouped that the operator can take a comfortable seated position facing such controls and manually operate the same without material fatigue or cramping from unnatural positions, while simultaneously watching both the copy or pattern and the work without substantial head movements, so that, the speed of the operator and rate of production can be maintained without sacrificing accuracy or quality of work.

Another object of the invention is to provide in an engraving and the like machine of such types, for operation upon either flat surface work or curved surface work; and a feature and characteristic is found in the design and arrangement of forming guide mechanism and its cooperative relation with the cutter spindle for curved surface work, by which it is possible for the cutter and cutter spindle to be operated efficiently and accurately without cutter spindle strain or binding, over the steep angles encountered in climbing or following curved work of small radii of curvature; and further in the arrangement of such curved surface forming guide mechanism by which the forming guide can be quickly moved to operative position, or to inoperative position when the machine is operated on flat surface work.

A further feature of the invention resides in the design and relative arrangement of the cutter spindle assembly in the cutter head, and the cutter spindle depth feed carried by an auxiliary swinging head on the cutter head above the spindle, by which the auxiliary feed carrying head can be swung laterally to a position permitting removal of the cutter spindle assembly from the head as a unit, and return of the spindle assembly and of the feed carrying head to operative position and relation without disturbing either the feed adjustment or the spindle assembly adjustment as set prior to removal of the spindle assembly.

Another object of the invention is to provide for so positioning the forming guide mechanism for curved surface work as to permit of the curved surface being on the top or upper side of the guide and located in full view of the operator, to thereby materially increase the facility and accuracy with which the operator can position the work with relation to the forming guide; and a characteristic of the arrangement for obtaining the above object is found in the location of the forming guide in operative position between the guide engaging member of the spindle feed and the upper end of the cutter spindle, with the guide free to float with the vertical movements of the spindle.

A further object of the invention is to improve and thereby increase the accuracy and sensitiveness of the operative connections between the pantograph and the laterally movable cutter head by which the cutter head is moved laterally to cause the rotary cutter to faithfully and accurately reproduce the copy or pattern in the desired scaled relation on or in the work.

Another object of our invention is to improve engraving machine efficiency and operation by including in the movement transmission means, by which a cutter head is moved laterally over the work to follow and reproduce the pattern or copy in scaled relation on the work, mechanism to convert straight line as well as universal lateral movements into two straight line movements perpendicular to each other and to transmit such two straight line movements to the cutter head as well as universal lateral movements.

The invention holds as further general objects and results, a design and arrangement of a machine of the types referred to, which is not only adapted to production classes of work, such as steel letter cutting and die work where speed of production is of more importance than accuracy, but is also capable of efficient production of the finer classes of work such as of the matrix types, either sunken or relief, and flat or curved surface; which eliminates all objectionable "under-cutting" of the work; and in which vibration and chatter are reduced to a minimum and practically eliminated.

With the foregoing general objects and features in view, as well as certain other features, objects and results which will be recognized from the following explanation, the invention consists in certain novel features of structure, and of arrangements and combinations of mechanisms and elements, as will be more fully and particularly referred to and specified hereinafter.

Referring to the accompanying drawings forming a part hereof:

Fisg. 9, 10, and 11 are detail sectional views through the curved surface forming guide holder mechanism.

Fig. 12 is a detail transverse vertical section taken on the line 12—12 of Fig. 3, and showing the coupling for the pantograph block to the cross slide of the rectilinear motion mechanism.

An embodiment of an engraving machine incorporating and including the principles and various features of our invention, is illustrated in the drawings by way of example, and includes the machine frame 1 and the upstanding column 2, at the front of which is arranged any suitable work table 3, preferably carried by vertically adjustable knee 4, on which the table is preferably adjustable horizontally forwardly, rearwardly, and laterally, although our invention is not concerned with any particular support or holder for the work.

Figure 7:
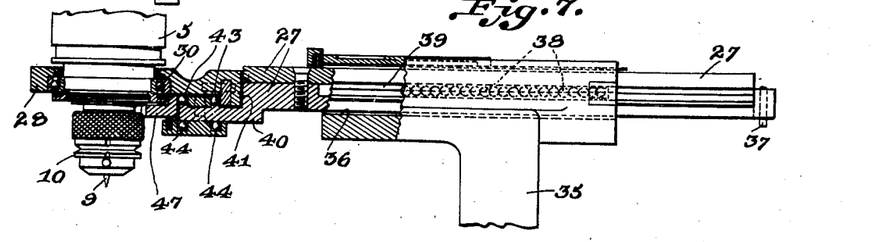
Fig. 7 is a view partly in elevation and partly in vertical section of the mechanism of Fig. 6, and showing the mounting of the cutter spindle and barrel assembly therein.
Figure 8:
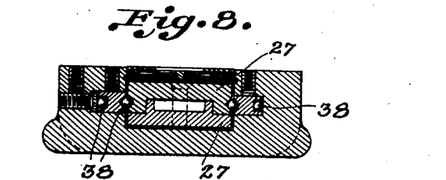
Fig. 8 is a transverse vertical section taken on the line 8—8, of Fig. 6.

Any suitable conventional or other cutter head 5 is supported in any suitable manner in front of column 2, and above the work table or other work holder, for free universal lateral or horizontal movement in all directions under the control and actuation of suitable movement transmitting mechanism, to cause the cutter head and its rotating cutter to follow the pattern or copy in reproducing the copy in the desired scaled relation on the work secured to the work table 3, or other work holder. In the particular example illustrated, we show a jointed horizontally-swingable link support from the main frame column 2, for and at its free end carrying the cutter head 5. This support, in this instance, embodies a laterally-swingable forwardly extending horizontal link 6, supported at one end from the column to swing on a vertical axis, and a horizontally extending link 7, supported at one end from the outer end of link 6, to swing horizontally on a vertical axis, while the free end of link 7 forms the vertically hollow housing of cutter head 5. In this housing, the rotary cutter spindle 8 is suitably mounted, and at its depending lower end is equipped with a chuck or other means to detachably hold the cutter 9. (See Fig. 7 in particular). The cutter spindle 8 is provided with suitable means for feeding and carrying the same to and from the work, as will be described hereinafter.

Figure 1:
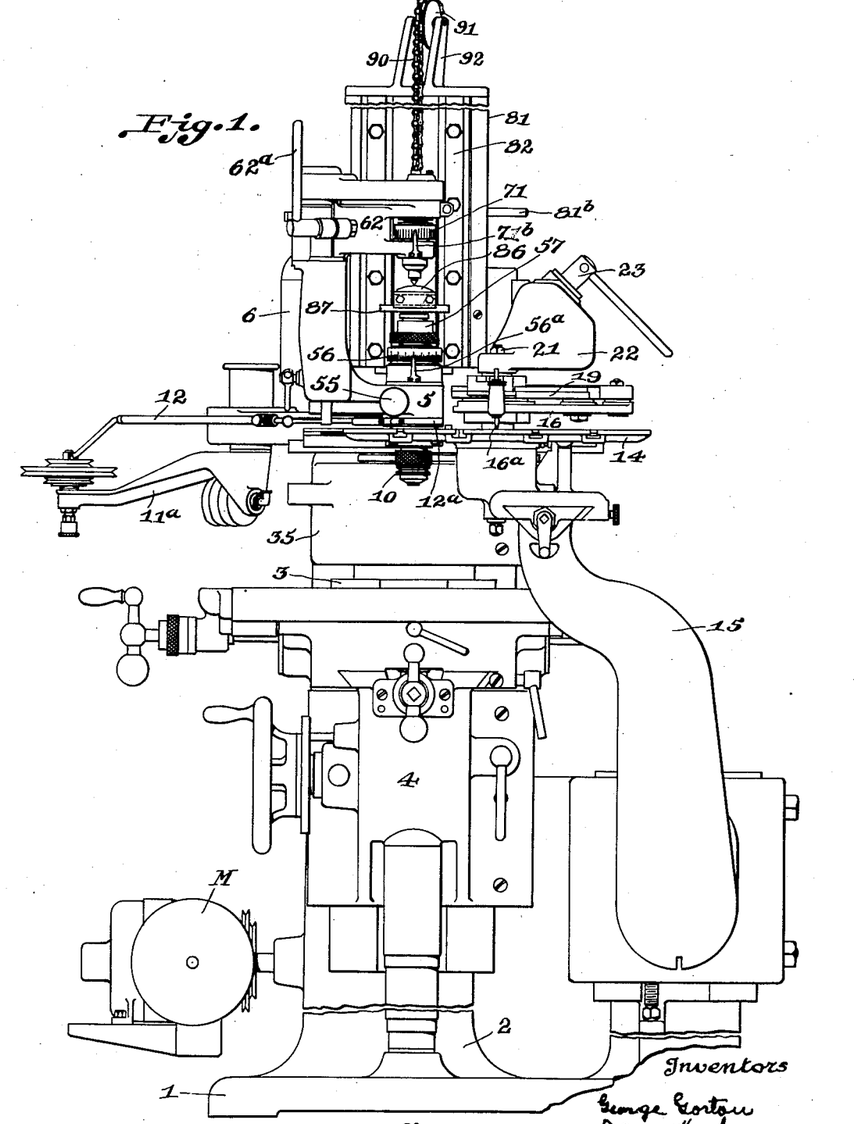
Fig. 1 is a front elevation of an engraving machine embodying our invention, and showing the forming guide mechanism for curved surface work in operative position.
Figure 3:
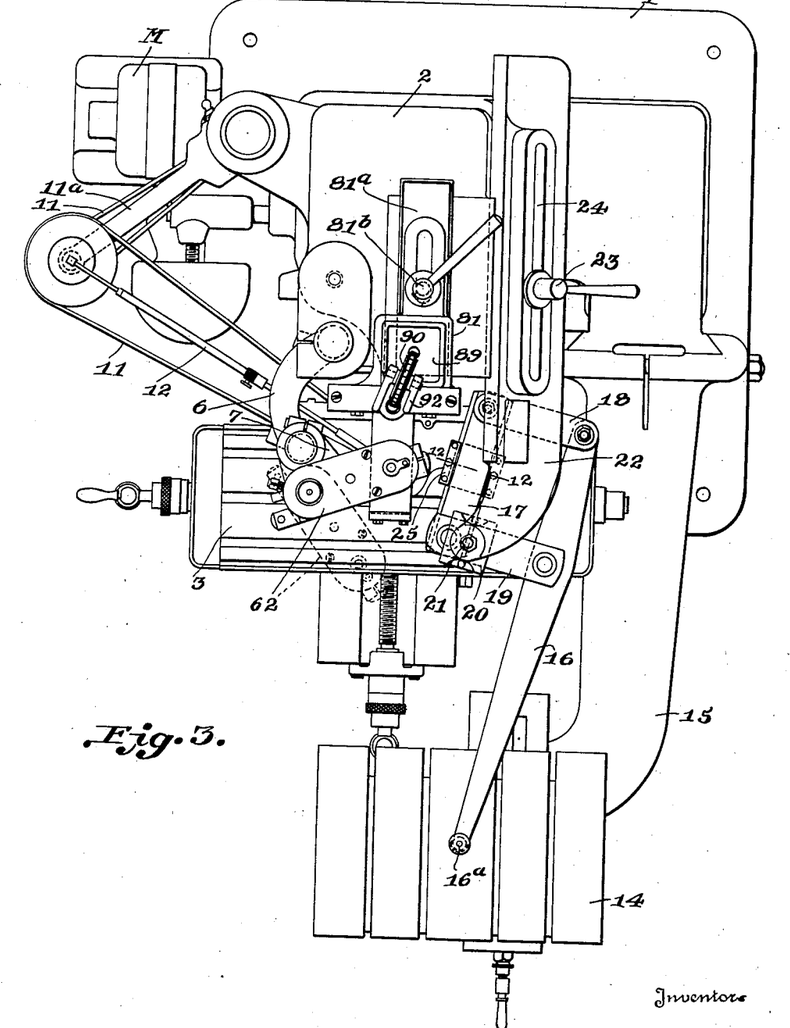
Fig. 3 is a top plan view of the machine of Figs. 1 and 2.

The rotary cutter spindle 8 is also provided with any suitable driving means, for instance in the example hereof, the cutter spindle is equipped with a driving pulley 10 driven from a motor M through the medium of a suitable belt drive, including the belts 11, referring here to Figs. 1 and 3, which belts are mounted on and over suitable guide pulleys carried by a swinging compensating arm 11a having push and pull connections with the cutter head 5, including rod 12 extending from the free end of arm 11a to the cutter head with which it is coupled by the ring 12a loosely surrounding the housing of cutter head 5. (See Fig. 1). The arrangement of the drive mechanism forms no part of our present invention and hence it is not deemed necessary to set forth a detail description thereof herein; suffice it to say that cutter spindle 8 is rotated throughout its operative lateral movements over the work from a motor through suitable drive mechanism.

Figure 4:
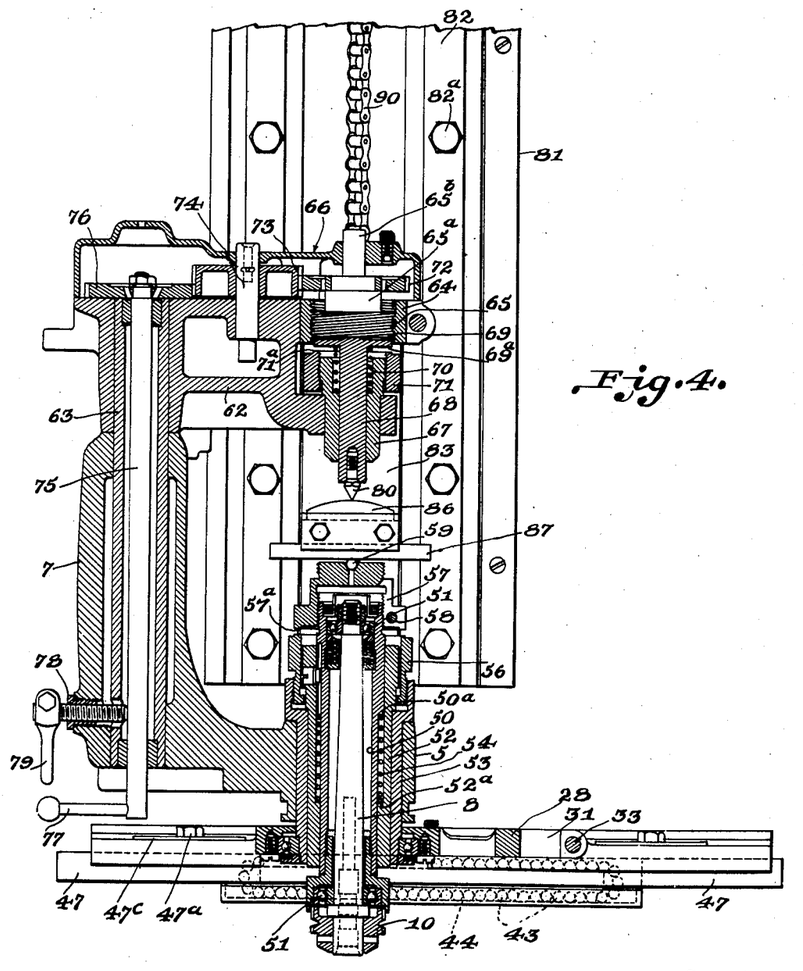
Fig. 4 is a vertical section through the cutter head spindle assembly and cutter head feed, with the cutter head and spindle guide and rectilinear motion mechanism, the curved surface forming guide being shown in the operative position of Figs. 1 and 2.

The rotary spindle 8, referring now to Fig. 4 of the drawings in particular, is mounted and carried in a suitable assembly to permit of such assembly being readily removed from and returned to mounted position in cutter head 5, as a unit. For instance, the cutter spindle 8 is mounted in and extends axially through a sleeve 50, being journaled in suitable spaced upper and lower anti-friction bearings 51 carried by the sleeve, and the sleeve 50 with spindle 8 is vertically reciprocally mounted and carried in a concentric barrel member 52. The barrel 52 is mounted and suitably removably held in the hollow housing formed by cutter head 5, or, as in the present example, in a suitable bushing or sleeve member 53 secured in head 5. The spindle 8 and sleeve 50 in which it is mounted and carried, are continuously urged and forced upwardly to their limit of upward movement in barrel 52, that is to normal inoperative position raising cutter 9 from operative work engaging position, by a coiled expansion spring 54 mounted in barrel 52 around the intermediate length of sleeve 50 between an upper shoulder 50a formed around the sleeve, and a lower shoulder 52a formed around the barrel 52. Spring 54 thus forces sleeve 50 with spindle 8 upwardly through the barrel, and the sleeve with spindle 8, is forced downwardly through the barrel and held against the force of spring 54 to a desired adjusted depth position for operatively engaging a cutter 9 with the work, by a suitable cutter feed mechanism to be later described.

The spindle assembly unit above described is removably secured in mounted position in the cutter head bushing 53 by a suitable clamping member which is actuated by a hand lever or a hand wheel 55 (see Fig. 1) to clamp the spindle barrel 52 securely against one side of the bushing, so that the barrel after removal and mounting is always accurately brought back to locate the cutter exactly in the same position. The cutter spindle assembly is readily removed by rotating hand wheel 55 a partial turn to release barrel 52, and then lifting the assembly as a unit from the cutter head 5. This enables grinding a cutter 9 without removing the same from the spindle assembly.

Depth stop means for adjustably determining the limit of downward movement of spindle 8 and the required working depth for a cutter in the work is provided, and in the instant example includes the stop ring member 56 threaded into the open upper end of the bushing 53 rotatably around the upper end of spindle barrel 52. The outer side face of this ring member 56 is graduated, preferably into say .00025", although of course not so limited, and these graduations provide vertical notches or grooves which cooperate with a spring finger or pointer 56a (see Fig. 1) to indicate the cutting depth for which stop ring 56 is set or adjusted. The upper edge of ring member 56 is accurately finished to provide the stop surface and the ring is adjustable to set the level or height of its upper edge surface by screwing the ring down into or upwardly from the upper end of the bushing 53 into which it is threaded.

The upper end of the spindle carrying sleeve 50 is externally threaded and has the cap 57 screwed thereon and thereover and suitably clamped in a desired fixed position thereon by a screw 58 (see Fig. 4). The lower annular edge 57a of the depending skirt of the cap 57 is accurately finished for engagement with the complementary upper edge of the ring member 56, to thus form a limiting stop engagement which determines the limit to which the sleeve 50 and spindle 8 can be lowered in barrel 52, in accordance with the vertical position to which the ring member 56 is adjusted. In this manner the cutting depth of the spindle carrying cutter 9 is accurately adjustably controlled.

Figure 5:
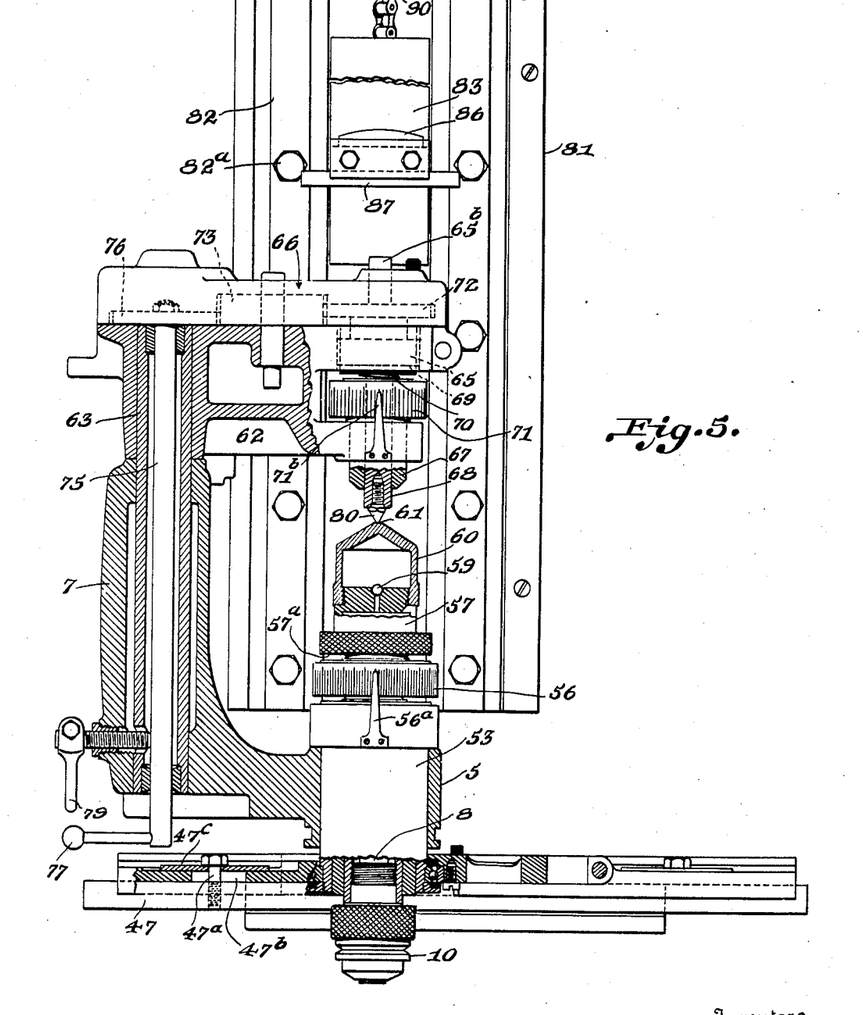
Fig. 5 is a view similar to Fig. 4, but partly in vertical section, and showing the arrangement of feed and cutter spindle assembly for flat surface work when the curved surface forming guide mechanism is in raised, inoperative position.
Figure 6:
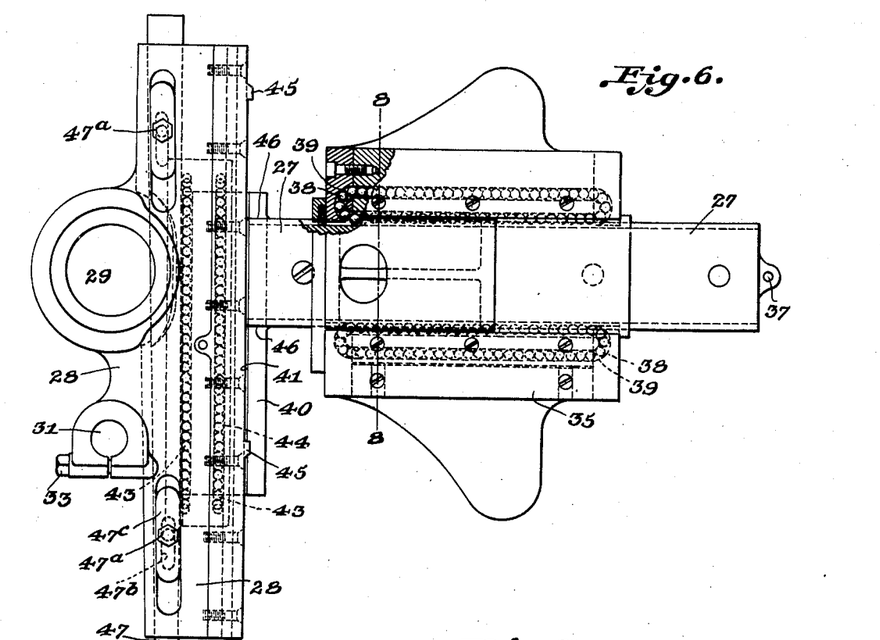
Fig. 6 is a top plan view of the rectilinear motion mechanism through which the cutter head and cutter spindle mechanism are moved laterally over the work.

The upper side or top of the cap 57 in the example hereof, is provided with the central tracing point or pin 59, axially alined with the spindle 8, and which is utilized, as will be later explained, when the curved surface forming guide mechanism is in operative position. (See Fig. 4). An upper cap member 60, referring now to Fig. 5, is threaded onto the upper end of lower cap 57, in vertical continuation of the lower cap, and in this instance, is formed with a conical or convex top wall providing at its apex or central portion a flat surface 61 in axial alinement with pin 59 and the spindle 8. This upper cap 60 is employed when the machine is operating on flat surface work, and fills the space which is occupied by the curved surface forming guide, the central surface 61 of the cap being engaged by the tracing pin of the spindle feed mechanism now to be described.

The spindle feed mechanism, referring to Figs. 4 and 5 in connection with Figs. 1 and 3, is arranged in and carried by a horizontally swinging head 62 which is pivotally mounted and swingably journaled on the upper end of the cutter head 7. For example, a hollow stud 63 is forced and held in vertical axial position extending upwardly through the hollow cutter head 7 and extends a distance upwardly thereabove, to provide the axis on which head 62 is mounted to rotate or swing through about 90°. The head 62 extends radially or laterally from the stud 63, across the machine and in its normal, inwardly swung operative position has its outer or free end disposed above the cutter spindle assembly, while in its outwardly swung position is removed from above the spindle assembly to permit of removal and insertion of the cutter spindle unit from and to its mounted position in the lower portion of the cutter head 7 (see the dotted line position of swinging head 62 in Fig. 3).

The free end of the swinging head 62 has the feed nut 64 clamped therein, which nut provides a vertical internally threaded bore therethrough in which the vertically disposed feed screw 65 is threaded; the nut and screw threads being of the so-called "quadruple" type to obtain a relatively fast movement for the screw 65 in the nut 64. The feed screw 65 is provided with the upwardly extending hub portion 65a and the guide stem 65b which is slidably received in a bearing bore formed through the cover 66 removably fitted over and providing a gear case or housing on the upper side of head 62. Below and in axial alinement with the nut 64 and feed screw 65, a hardened stud and bearing 67 is forced 65, into fixed, secured position in the lower portion of the free end of the head 62, and a stud 68 having an enlarged, flat upper end head 69, is vertically slidably mounted in and extending downwardly through tubular stud or bearing 67. The flat head 69 of vertically slidable stud 68 is disposed between the upper end of bearing 67 and the lower or under side of feed screw 65, and a coiled expansion spring 70 is mounted around stud 68 under compression between head 69 and the lower end of an annular recess formed around the stud in bearing 67. The spring 70 normally forces and maintains head 69 in engagement with the under side of feed screw 65, the feed screw 65 when moved downwardly forcing stud 68 downwardly against spring 70, while when moved upwardly the spring 70 causes stud 68 to follow and maintain stud head 69 in engagement with the feed screw.

An adjustable depth stop arrangement is provided for limiting the downward movement of stud 68 and feed screw 65, which consists in the specific form hereof, of a ring member 71 adjustably threaded over and around the upper end portion of bearing 67 and formed with an annular flat face 71a around its upper edge for stop engagement with a similar annular flat face 69a on the under side of stud head 69. The outer side of ring 71 is formed with suitable graduations of say .00025", although not so limited of course, in the form of vertical grooves or notches therearound for snap engagement by a spring pointer 71b (see Fig. 1). By screwing ring 71 upwardly or downwardly to the desired adjusted position, the limit of downward feeding movement of stud 68 by feed screw 65 is set, stud head 69 making stop engagement with the upper edge of ring 71 and the depth or extent of the stop or lowered position in depth of cut in the work being indicated on the graduations by pointer 71b. This depth stop arrangement is intended for use primarily when the curved surface forming guide mechanism (to be later described) is in operation, the depth stop ring 56 on the cutter spindle assembly being utilized when flat surface work is performed and the forming guide mechanism is in its inoperative position.

The feed screw 65 is rotated to raise or lower the same in feed nut 64 by a gear train under manual control of the operator, and this gear train includes a gear 72 fixed on the upper end of feed screw hub 65a in mesh with a relatively wide or thick idler gear 73 freely rotatable on the vertical stud 74 carried by and between the head 62 and cover 66; these gears 72 and 73 being disposed and housed within the cover 66 on the upper side of swinging head 62. An operating shaft 75 extends axially through hollow stud 63 in the cutter head 7, from the lower end to the upper end thereof, and is journaled in suitable bearings fixed in the upper and lower ends of this stud 63. A relatively thin gear 76 is fixed to the upper end of shaft 75, in mesh with idler gear 73, so rotating shaft 75 will, through the enmeshed gears 76, 73, and 72, rotate the feed screw 65 to cause such screw to either move upwardly or downwardly, depending on the direction of rotation of shaft 75, and feed the stud 68 upwardly or downwardly in swinging head 62. The shaft 75 depends a distance below the lower end of cutter head 7, and is provided with an operating hand lever 77 on its lower end spaced from cutter head 7. The shaft 75 is also vertically slidable in its bearings to permit of its being pushed upwardly a sufficient distance to raise its gear 76 above and out of mesh with the idler gear 73. In raised position hand lever 77 can be brought into any desired position when the shaft is dropped or lowered to mesh gear 76 with idler gear 73.

A clamping screw 78 is threaded through cutter head 7 side wall and extends through an opening in hollow stud 63, for end clamping engagement with shaft 75 to hold this shaft against accidental movement or displacement from an adjusted position. An operating hand lever 79 is provided on the outer end of the screw 78 for ease of screw actuation to and from shaft setting position.

With the swinging head 62 swung into its normal operative position, the stud 68 and the tracer pin 80 mounted in its lower end, are vertically axially alined with cutter spindle 8 and the upper cap 60 of the spindle assembly, referring now to Fig. 5 in particular. The feed mechanism through hand lever 77 is actuated to raise feed screw 65, and the stud 68 with its tracer point 80 are raised and forced to follow screw 65 under the action of spring 70. The raised position of tracer pin 80 is followed by raising of the cutter spindle and carrying sleeve 50 under the action of cutter spindle assembly spring 54, until the flat surface 61 of cap 60 engages against tracer pin 80. The cutter 9 carried by the cutter spindle is thus brought to normal raised and inoperative position above the work clamped on work table 3. The cutting depth stop ring member 56 is adjusted for the required depth of cut, and the feed mechanism is actuated by lever 77 to rotate feed screw downwardly, which, through stud 68 and pin 80 forces the cutter spindle 8 and cutter 9 downwardly until surface 57a of lower cap 57 engages depth stop 56 and locates the cutter accurately for the required depth of cut. Operation of the machine for flat surface work is then carried on by pattern controlled lateral movements of the cutter head and cutter spindle carried thereby over the work, the feed mechanism through tracer pin 80 holding the cutter spindle and its cutter and the required depth as accurately determined by the depth stop ring 57. Upon completion of the operation, the cutter spindle and cutter are raised to inoperative position by actuation of the feed mechanism to raise stud 68 and tracer pin 80 and allow spring 54 to raise or elevate the cutter spindle carrying sleeve 50 in the cutter spindle assembly.

In accordance with our invention, provision is made for operation of the machine on curved surface work, and in carrying out this provision in the machine of the example hereof, a curved surface forming guide mechanism is operatively incorporated and embodied therein for selective substitution for the previously described arrangement and association between the cutter spindle assembly and feed mechanism of Fig. 5, for carrying out flat surface work. The forming guide mechanism is shown particularly by Figs. 1 to 4, in connection with the details of Figs. 9, 10, and 11, and includes in this instance, an upstanding, vertically disposed hollow frame or casing 81 providing an open-top vertical well therein. This frame 81 is suitably mounted on the upper end of column 2 disposed adjacent the forward side thereof and spaced to the rear of cutter head 7 and the cutter spindle assembly, by a base 81a for horizontal adjustment toward and from the spindle assembly and work table 3 (forwardly and rearwardly of the machine); suitable clamping means 81b being provided for securing the base and frame in an adjusted position on column 2. The relative location of and adjustable mounting for frame 81 will be clear by reference to Fig. 3 in particular.

Figure 9:
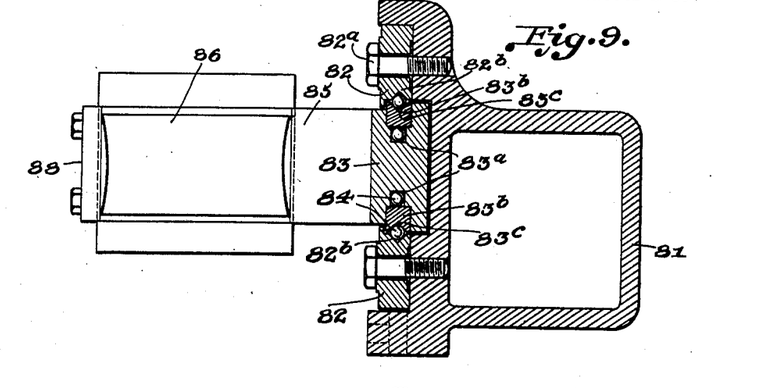

At the forward, laterally enlarged or widened side of frame 81, spaced, vertical and parallel slideways are formed and provided by the hardened strip members 82 removably secured in position by the bolts 82a, referring here to Fig. 9, and each of these strips is formed along its inner edge with a vertical groove or ball raceway 82b. A carriage 83 is mounted and confined between the spaced slideway forming strips 82, for free, minimum friction vertical sliding therein and therebetween. For instance, the opposite vertical edges of the carriage 83 are formed with the vertical grooves 83a therein which are closed by the strips 83b having the vertical grooves or ball raceways 83c in their outer edges, so as to form vertical ball receiving passages through the carriage at opposite sides thereof. An endless series of anti-friction balls 84 is mounted in and occupying each groove 83a and the adjacent facing ball raceways 82b—83c, respectively, curved guide portions 83d (see Fig. 11) being provided on the carriage 83 across the top and bottom of each series of balls to confine the balls and guide them to and from the passages and adjacent raceways 82b—83c, respectively. In this manner, carriage 83 is confined between and in the slideways provided by strips 82, by the balls 84 in the raceways 82b—83c, at opposite sides of the carriage, and the carriage is freely vertically slidable between strips 82 on the opposite series of balls 84 which roll around their endless raceways as the carriage is moved vertically.

Figures 10, 11, 12:
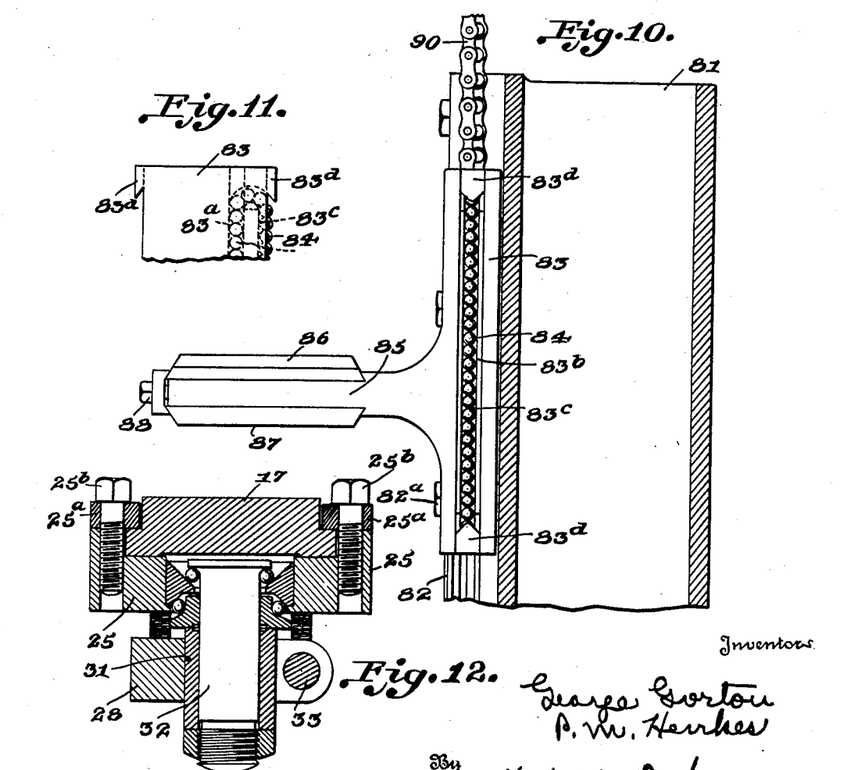

The carriage 83, in the example hereof, is provided with the forwardly extending, horizontally disposed forming guide holder 85 into which the upper curved surface forming guide 86 and the lower flat surface guide 87, or if desired a unit guide having a curved upper and flat lower face, are removably secured by the clamping means 88 (see Figs. 9 and 10).

The forming guide holder 85 and carriage 83 are counterbalanced by a weight 89 (see Figs. 2 and 3) vertically movable in the well formed by frame or housing 81, and connected to the end of a flexible connection, such as the chain 90, which extends upwardly over a pulley or roller 91 mounted in the bearing bracket 92 fixed on the upper end of the frame 81, and downwardly to the upper end of carriage 83 with which it is coupled. The counterbalancing of the carriage and guide holder with the carriage mounted on the balls 84, renders the carriage very easily vertically movable and sensitive under minimum effort and small forces.

When the machine is operating on flat surface work with the cutter spindle assembly and feed mechanism in the operative, flat work performing association of Fig. 5, the forming guide holder and carriage 83—85, are moved or raised to and are in normal inoperative position at the upper end of the frame 81, above and in non-interfering relation to cutter head 7 and associated mechanism, including the cutter spindle assembly. Such elevated inoperative position of the curved surface forming guide mechanism is shown in Fig. 5 of the drawings.

The machine is converted to curved surface work and the curved surface forming guide mechanism is brought into operative association with the cuttter spindle assembly and cutter spindle feed mechanism, by bringing the cutter spindle to inoperative position, through actuation of the feed mechanism as explained hereinbefore, and then through swinging head 62 clamping lever 62a (see Fig. 1), by which the head 62 is secured in operative position, releasing the swinging head and swinging the same outwardly about 90° from above the cutter spindle assembly (see dotted line position of head 62 in Fig. 3). The upper cap 60 is then removed from the spindle assembly, and preferably depth stop 56 is screwed down to its lowest position. The forming guide holder and carriage 83—85 are lowered on frame 81 to position the forming guide 86 below the level of swinging head tracer pin 80, after which the swinging head 62 is swung back to and clamped in operative position with the forming guide holder and forming guides therein located between the upper tracer point 80, and lower tracer pin 59 of cap 57 on the spindle assembly.

With the forming guide holder in the foregoing operative position (see Figs. 1, 3, and 4 in particular), the spindle spring 54 forces the spindle and its carrying sleeve 50 upwardly to engage tracer pin 59 with the flat under face of forming guide 87, and as the forming guide holder and its carriage are freely and sensitively vertically floating, the forming guide holder is forced upwardly until the curved upper surface of the top forming guide 86 engages against the swinging head carried tracer pin 80. As the upper tracer pin 80 is a fixed contact point, except when moved upwardly or downwardly for setting by the feed mechanism, when the cutter head is moved laterally over the work, the upper, curved surface of top forming guide 86 is caused to follow in contact with tracer 80 by spring 54 and the cutter spindle is caused to raise and lower, forming guide holder and carriage 85—83 freely sensitively floating in contact therewith through pin 59 and flat surface guide 87, to follow and conform to the curved surface of guide 86.

By the foregoing arrangement of our invention, it is now possible to work upon curved surfaces of very small radii of curvature and to readily cause the cutter spindle with a cutter 9 to climb such very steep angles or curves in an efficient manner with an easy free motion without any cramping or binding action or other strains, on or in the cutter spindle and its associated assembly. The location of the curved surface forming guide, such as guide 86, on top of the holder 85 with the curved surface at the upper side thereof, renders the proper location of the guide, and the work on table 3, by the machine operator an easy and accurate operation, particularly as a guide 86 is positioned in a readily visible location with respect to the operator and adjacent mechanism and can thus be readily measured.

The return of the forming guide to inoperative position and setting of the machine for flat surface work will be readily apparent from the foregoing. It is only necessary to swing head 62 outwardly, raise the forming guide holder to inoperative position, mount upper cap 60, and then swing head 62 back to operative position. Such operations can be very quickly carried out to convert the machine for either flat or curved surface work.

Figure 2:
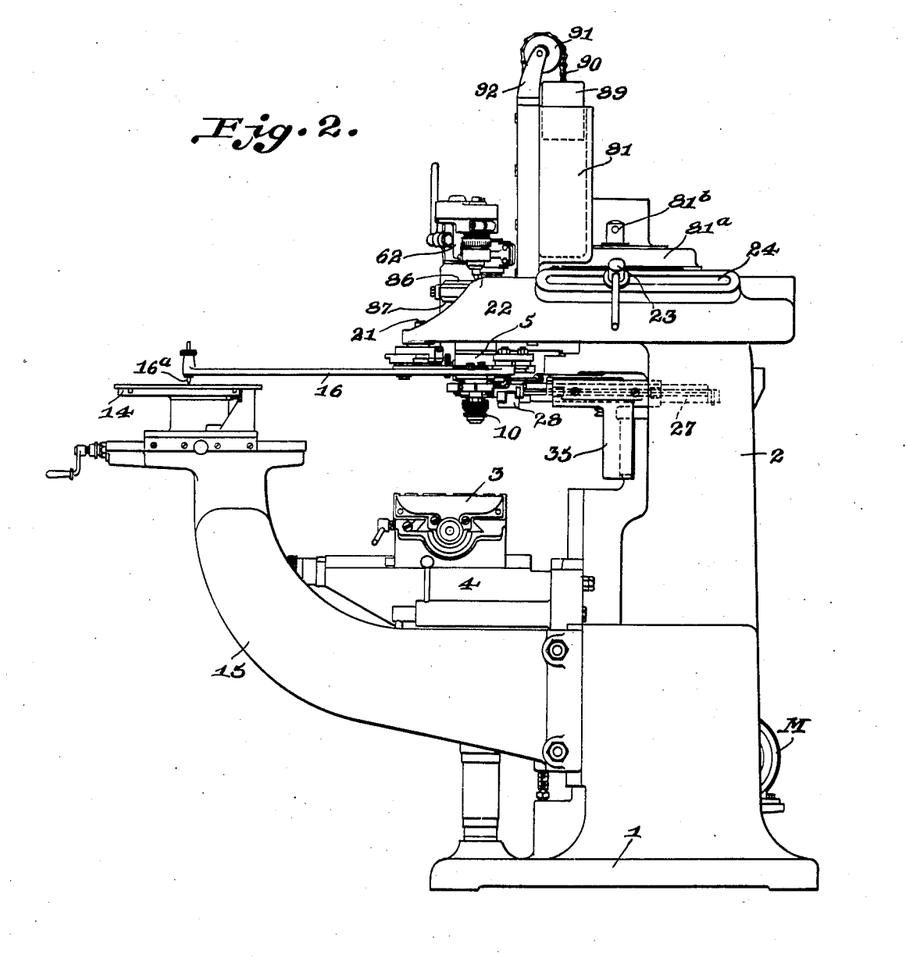
Fig. 2 is a side elevation of the engraving machine of Fig. 1, taken as from the right hand side when facing the front of the machine.

Our invention is further concerned with the mechanism for transmitting motion to the cutter head and spindle assembly carried thereby, from a pattern or copy to be reduced which is clamped on a suitable pattern holder or support, such as the flat table 14 shown in Figs. 1, 2, and 3. For example, in the specific arrangement hereof, such table 14 is mounted at the right hand side of the machine, on and above the upper end of a supporting arm 15, carried by and extending forwardly and upwardly from the supporting frame of the machine. This supporting arm 15, is preferably vertically adjustable with respect to the frame and normally rigidly clamped thereto, and the copy holder 14 is preferably horizontally adjustable with respect to arm 15, as clearly illustrated in the above referred to Figs. 1 to 3 of the drawings.

Associated with and forming a cooperative element of the motion transmitting mechanism for generating the lateral movements of the cutter head to reproduce a pattern in scaled relation on the work, we have provided a more or less conventional or common form of horizontally arranged pantograph. Such pantograph includes a horizontal manually actuated operating arm 16, at its free end overhanging the copy holder 14, and at its free end extremity provided with the depending stylus or tracer 16a to follow the copy. This arm 16 constitutes the tracing stylus or manually actuated long operating arm of the pantograph. The so-called long slider bar 17 of the pantograph carries slide block 25, and is pivotally connected to the long arm 16, at one end by link 18, and at the other end by so-called short slider bar 19. The slide block 20 is located on bar 19, and supports the pantograph through the medium of bar 19, from vertical pivot pin or stud 21 on which the pantograph swings and by which it is pivotally hung from and supported by the horizontal forwardly extended front end or nose of bracket or block 22, normally clamped or otherwise rigidly secured to the top portion of the machine frame, that is along the right hand side of the upper end portion of column 2. This bracket is preferably adjustable forwardly and rearwardly of and with respect to the frame, when its clamping bolt 23 that extends into the frame through longitudinal slot 24 in the bracket, is loosened. When adjusted the bracket is rigidly held in the adjusted position by tightening its clamping bolt 23. (See Fig. 3.)

The slide blocks 20 and 25 are normally fixedly clamped to their respective bars 19 and 17, but each bar is longitudinally adjustable with respect to its slide block, or each block is longitudinally adjustable with respect to its slide bar, for well known purposes and according to common practice.

The pantograph is operated, in the example shown, by the hand of the operator applied to the long arm 16, and the universal horizontal lateral movements of said arm, as translated by the pantograph, are transmitted to the slide block 25, and from said block are transmitted to the cutter head through the medium of mechanism hereinafter described or its equivalent.

Straight line, rectangular or rectilinear motion mechanism is utilized to operatively connect the pantograph with the cutter head, say through the pantograph slide block 25, if a pantograph of the type of that illustrated is employed, although we do not desire to limit our invention in all respects to the pantograph as shown, as any other pantograph or other mechanism actuated by means tracing or following a pattern is within the spirit and scope of the invention, where suitable or adaptable for laterally shifting the cutter through the medium of rectangular or rectilinear motion mechanism. The rectilinear motion mechanism is actuated by the pantograph or its equivalent, and said mechanism is constructed and arranged to move only in two straight lines perpendicular to each other, and actuates and controls the cutter head on its lateral movements over the work. These movements are translated at the cutter head into straight line movement to the right and left, and where said mechanism is operated to produce both straight line movements simultaneously, the resultant movement of the cutter head may be on any diagonal straight or curved line as required by the pattern being traced by the stylus and translated by the pantograph and thus transmitted to said mechanism.

An example of rectilinear motion mechanism for actuation by a pantograph or its equivalent, and for actuating and guiding the cutter head on its lateral movements to reproduce the copy on the work, is illustrated in the accompanying drawings, having particular reference to Figs. 4 to 8. Such mechanism in this example, embodies slides, one of which is directly operatively coupled to the cutter head concentrically with the cutter spindle, to actuate the same on its lateral movements, and is also directly coupled to the pantograph to be actuated thereby, and is also directly coupled to the other slide to actuate said last named slide on its straight line endwise movements. These two slides are confined to two rectilinear or straight line endwise movements, one straight line endwise movement perpendicular to the other straight line endwise movement, with one slide carried by the other slide. In this example, a longitudinally elongated horizontal forwardly and rearwardly extending main slide 27 is provided, which is confined by suitable guides to endwise straight line movement only, forwardly and rearwardly of the machine, with friction and resistance to its sliding movements reduced to the minimum.

The other longitudinally elongated horizontal or cross slide 28 is arranged transversely of the front end of main slide 27, and is carried thereby; being confined thereto by suitable guideways to straight line endwise movement only in either direction right or left in a line perpendicular to the straight line endwise movement of the main slide 27 forwardly or rearwardly. The cross slide 28 is guided to reduce friction and resistance to the minimum, and said cross slide while it reciprocates endwise freely transversely of and with respect to the main slide, yet said cross slide actuates the main slide on its forward and rearward endwise movements and said cross slide is then carried bodily forwardly and rearwardly by the main slide.

The cross slide 28 is formed with a front vertical opening or bearing 29, through which the depending portion of cutter head carried sleeve or bushing 53 extends, and in which it is mounted preferably on ball bearings 30, to operatively couple said head with the cutter spindle assembly carried thereby in the bushing 53, and the slide together concentrically with respect to the cutter head and its cutter spindle 8. This coupling of the cutter head and spindle mechanism provides through bearing opening 29 and bearing 30, the required sensitive free connection without looseness but free of binding or tightness.

The cross slide 28 is also formed with a front vertical socket or opening 31 (see Figs. 6 and 12), spaced from bearing bore 29, to receive a stud or pin 32, by which a pantograph, such as pantograph slide block 25, is operatively coupled to said slide centrally with respect to block 25, to actuate the cross and main slides. Slide block 25 may, as disclosed by Fig. 12, be provided with clamps 25a and clamping screws 25b for securing the block in adjusted position on pantograph bar 17, stud 32 being journaled in any suitable anti-friction bearings as indicated. The vertical socket 31 is preferably formed of or rigid with the cross slide and is preferably in the form of a split contractile hub equipped with contractile or clamping bolt 33, whereby the socket can be tightened on the center stud 32, if so required.

The main slide 27 extends rearwardly from the cutter head and front slide 28, and is supported from the machine supporting frame. For instance, the slides are supported by a bracket 35, normally rigidly clamped to the front of the machine frame column 2, preferably in such a manner as to be vertically adjustable. This bracket 35 is formed with a horizontally disposed top extending into an opening in the front wall of the column. This horizontal top of the bracket provides a horizontal forwardly and rearwardly extending passage or guideway 36 (see Fig. 7) in which said main slide 27 is confined to straight line endwise reciprocation and by which said slide is supported in its horizontal position. The main slide 27 extends forwardly and rearwardly beyond said bracket 35, and is limited in its forward movement by rear stop 37 (see Fig. 7). The main slide is supported and confined in said bracket, preferably, by endless series of anti-friction balls 38, flowing or traveling in processions in either direction in endless runways 39 (see Fig. 6), to reduce friction and resistance to the minimum, and to also prevent objectionable vertical and lateral play while permitting free and easy endwise reciprocation of the slide in the bracket 35.

At its front end, the main slide 27 is formed with a longitudinally elongated cross head 40, rigid with said slide, and providing a guideway 41, longitudinally of said cross head and at right angles to the longitudinal axis of main slide 27. The cross slide 28 is arranged longitudinally of said guideway and is confined therein to endwise reciprocation, preferably by and on endless series of traveling anti-friction balls 43, flowing or traveling in processions in either direction in endless raceways 44 (see Figs. 6 and 7).

The cross slide 28 is preferably provided with rear stops 45 to engage abutments 46, respectively, of the main slide 27, and limit the endwise movement of the cross slide in either direction. The cross slide 28 is also provided with adjustable gib 47, whereby looseness can be taken up. Gib 47 is equipped with the clamping screws 47a extending through slots 47b and bearing upon elongated washers 47c countersunk in the slide and closing slots 47b, through the medium of which the gib is clamped in its adjusted take-up position. (See Fig. 5 of the drawings).

The more or less heavy cutter head with cutter spindle 8 assembly, is carried by the horizontally swinging link which carries the load imposed thereon by said head, and relieves the rectilinear motion mechanism from carrying such loads, in whole or in part. The cutter head supporting linkage is of strong construction and mounting to prevent sagging and to maintain the cutter head and cutter spindle assembly carried thereby, throughout lateral movements over the work table 3 and work thereon, against any sagging or deflection from the desired horizontal plane in which said head and cutter spindle are laterally movable.

The depending lower end of the bushing 53 in which the spindle assembly is carried on the cutter head 7, is journaled in the rectilinear motion mechanism, to provide a bearing concentric with the longitudinal axis of the rotary cutter spindle 8, whereby said mechanism is directly operatively pivotally coupled to said cutter head by a push and pull and holding guide connection capable of moving the cutter head with the cutter spindle in a horizontal plane to all portions and areas of the work table and work. The swingable linkage supporting the cutter head permits the cutter head and spindle to be very easily pushed and pulled, with the expenditure of minimum force and without jerking or overthrow, to apply the rotary cutter over and at any and all portions of the work, and to thus hold the same as the work progresses.

After the pattern or copy has been clamped and properly located on the copy holder 14, and the work on which the copy is to be reproduced has been clamped and located properly on the work table 3, the cutter head and cutter spindle assembly with the spindle feed mechanism having been operatively associated, adjusted and set for either flat surface or curved surface work as the case may be, the operator faces the machine and with his hight hand on the long arm 16 of the pantograph proceeds, as usual, to move said arm to cause the stylus thereof to trace the copy. The pantograph is thereby operated to transmit to the pantograph parts 17, 25, that are operatively coupled to the rectilinear motion mechanism, the movements of the stylus in scaled relation, and said parts thus actuate said mechanism to transmit said movements to the cutter head to carry the rotary cutter spindle 8 (rotated from motor N) with cutter 9 horizonally over the work in performing its function of reproducing the copy or pattern in scaled relation on the work.

An organization, arrangement, and relative association of the elements and mechanisms in accordance with the principles and features of our invention, thus produces a machine in which the pantograph, pattern holder, cutter spindle assembly, and feed mechanism control, are grouped substantially directly in front of the operator in seated position facing the machine; these elements being for practical purposes substantially in the same horizontal plane in terms of normal head and eye, and arm movements of the operator. The operator can thus grasp the pantograph tracer arm with his right hand and the spindle feed mechanism control lever 77 with his left hand, while the cutter spindle assembly with cutter 9 are directly in full vision in front of the operator without calling for excessive or abnormal, fatiguing eye or head movements in following and guiding the progress of the work.

The location and disposition of the pattern holder and pantograph mechanism at a level below the cutter spindle assembly for comfortable natural operator position manipulation, is essentially contributed to by the cooperative arrangement and coupling of the rectilinear motion mechanism between the pantograph and the cutter head and spindle assembly, for transmitting the pantograph tracer movements in accurately reproduced scaled relation to the cutter head and spindle assembly. The arrangement of the swinging head and feed mechanism on the cutter and the arrangement and relation to the spindle assembly of the curved surface forming guide mechanism makes possible the positioning of the curved surface forming guide with its curved surface uppermost and above the cutter spindle assembly in full vision of the operator for measurement and adjustment, while the floating arrangement for such guide materially increases the capacity of the machine for accurate, speedy and efficient work on curved surfaces of the smaller radii of curvature and steep angles of cutter climb.

It is further evident that various changes, modifications, rearrangemens, additions, substitutions, and eliminations, as well as adaptations and embodiments of the features of the invention to various other machines than the example disclosed, may be resorted to, and hence we do not intend or desire to limit ourselves in all respects to the exact and specific disclosures hereof.

What we claim, is:

1. In combination, a cutter head universally movable laterally over the work and provided with a rotary cutter spindle; supporting means for carrying said cutter head on its universal lateral movements; a pantograph mechanism for tracing the copy; said pantograph mechanism disposed at one side of and spaced from said cutter head in a substantially horizontal plane below the upper end of the cutter head and rotary spindle; and rectilinear motion mechanism operatively coupling said pantograph mechanism with the cutter head for transmitting pantograph movements to actuate the cutter head on its universal lateral movements to carry the rotary cutter over the work to reproduce the copy on the work in scaled relation.

2. In combination in an engraving and the like machine, a cutter head universally laterally movable over the work, a vertically axially movable rotary cutter spindle assembly carried by the cutter head, supporting means for carrying the cutter head in its universal movements over the work, means disposed at one side of and below the upper ends of the cutter head and cutter spindle assembly and operatively coupled with the cutter head for actuating the latter to carry the cutter spindle over the work to reproduce the copy on the work in scaled relation, feed mechanism carried by the cutter head for operative association with and application of vertical feeding force to the upper end of the cutter spindle assembly, and curved surface forming guide means removably interposed between the spindle feed mechanism and the upper end of the spindle assembly.

3. In an engraving and the like machine, in combination, a cutter head universally laterally movable over the work, a vertically axially movable rotary cutter spindle assembly carried by the cutter head and including means normally forcing the cutter spindle to raised position, means disposed at one side of and below the upper ends of the cutter head and cutter spindle assembly operatively coupled with the cutter head for actuating the latter to carry the cutter spindle laterally over the work to reproduce a pattern on the work in scaled relation, feed mechanism carried by the cutter head and including a tracer point above the cutter spindle assembly for applying downward feeding forces thereto, and a freely floating curved surface forming guide mechanism interposed between and in operative engagement with the upper end of the spindle assembly and said tracer point thereabove.

4. In an engraving and the like machine, in combination, a cutter head universally laterally movable over the work, a vertically axially movable rotary cutter spindle assembly carried by the cutter head and including force means normally forcing the rotary cutter spindle to raised position, cutter spindle feed mechanism carried by the cutter head and including a tracer point above and for engagement with the spindle assembly to feed the cutter spindle downwardly against said force means, freely vertically floating curved surface forming guide mechanism including a forming guide having a flat lower surface and a curved upper surface, interposed between said tracer point and the upper end of the spindle assembly with the top tracer engaging the curved surface and the spindle assembly the under flat surface of said guide, and means for moving said cutter head and spindle assembly laterally over the work to reproduce a pattern on the work.

5. In an engraving and the like machine, in combination, a cutter head universally laterally movable over the work, a vertically axially movable rotary cutter spindle assembly carried by the cutter head, a horizontally swingable head on the upper end of the cutter head extending over and above the spindle assembly, cutter spindle feed mechanism mounted on said swinging head and including a tracer point for engagement and axial alinement with the spindle assembly, said tracer point vertically movable by the feed mechanism to vertically feed the cutter spindle, and said swinging head swingable to position from above the spindle assembly to permit removal and insertion of the latter from the cutter head.

6. In an engraving machine and the like, in combination, a cutter head universally laterally movable over the work, a vertically axially movable rotary cutter spindle assembly carried by the cutter head and including force means normally forcing the cutter spindle to raised position, a horizontally swingable head on the cutter head in normal position extending over and above the cutter spindle assembly, cutter spindle feed mechanism mounted on said swinging head and including a depending vertically axially movable tracer pin for engagement and axial alinement with the upper end of the spindle assembly and actuation by the feed mechanism to force the cutter spindle downwardly, forming guide mechanism including a freely vertically movable forming guide interposed between and operatively engaged by said tracer pin and cutter spindle assembly and freely floating with said cutter spindle under the action of the spindle raising force means, said feed mechanism carrying head swingable to position removed from above the cutter spindle for raising the forming guide to an inoperative position above the cutter spindle assembly and head when the latter is swung back to normal operative position.

7. In an engraving machine and the like, in combination, a vertically axially movable rotary cutter spindle carrying barrel laterally movable over the work, including force means for normally forcing the cutter spindle barrel upwardly to raise the cutter spindle, a vertically adjustable tracer member above and in axial alinement with the cutter spindle barrel, and forming guide mechanism including a freely vertically movable forming guide interposed between the upper end of the spindle barrel and the tracer member thereabove, said forming guide having a flat under surface engaged by the upper end of the spindle barrel and a curved upper surface forced against and maintained in engagement with the tracer member by the spindle barrel raising force means, said spindle barrel and forming guide freely vertically movable in following said curved upper surface of the forming guide as the spindle and tracer member are moved laterally over the work.

8. An engraving machine having a cutter head provided with a rotary driving spindle for the rotary cutter, said head being movable in any direction on curved and/or straight lines over the work in a plane perpendicular to the axis of said spindle; and means for controlling the lateral position of said cutter head and for moving the same in any direction in said plane to carry the rotary cutter over the work in reproducing a pattern on the work, said means including a pantograph having means to trace a pattern for reproduction by the rotary cutter on the work, and rectangular motion mechanism operatively connecting said pantograph and cutter head for actuation by the pantograph and to transmit the rectangular motions of said mechanism to said cutter head to move the cutter head in said plane on curved and/or straight lines over the work.

9. An engraving machine having a cutter head provided with a rotary driving spindle for the rotary cutter, said head being movable in any direction on curved and/or straight lines over the work in a plane perpendicular to the axis of said spindle; and means for controlling the lateral position of said cutter head and for moving the same in any direction in said plane to carry the rotary cutter over the work in reproducing a pattern on the work, said means including rectangular motion apparatus supported independently of said head and including a main endwise movable straight line movement slide, and a cross endwise movable straight line movement slide relatively movable with respect to said main slide and actuating said main slide on its endwise movements, said cross slide being operatively coupled to said head, and means for actuating said mechanism, said means being operatively coupled to said cross slide.

10. An engraving machine having a cutter head provided with a rotary driving spindle for the rotary cutter, said head being movable in any direction on curved and/or straight lines over the work in a plane perpendicular to the axis of said spindle; and means for controlling the lateral position of said cutter head and for moving the same in any direction in said plane to carry the rotary cutter over the work in reproducing a pattern on the work, said means including an endwise movable slide confined to move in a straight line and operatively coupled to said head, means rendering said slide bodily movable laterally in a straight line perpendicular to its endwise straight line movement, and a pantograph operatively coupled to said slide to actuate the slide on said straight line endwise movement and on said straight line movement perpendicular to said endwise movement.

11. In combination in an engraving and the like machine, a cutter head universally laterally movable over the work, a rotary cutter spindle vertically axially movable on and carried by the cutter head, a normally vertically fixed tracer member above the rotary cutter spindle in axial alinement and operatively associated therewith to determine the vertical position of the cutter spindle, a freely vertical movable forming guide removably interposed between the cutter spindle and said tracer member and having a curved upper surface engaged by the tracer member, means resiliently forcing the cutter spindle upwardly and maintaining the curved surface of the forming guide in contact with the tracer member as the cutter head and spindle are moved laterally over the work, a pantograph mechanism for tracing the copy, and rectilinear motion mechanism for actuation by the pantograph in tracing the copy in scaled relation on the work, said rectilinear motion mechanism operatively coupled to the cutter head concentric with and adjacent the lower end portion of said rotary cutter spindle.

12. In an engraving and the like machine, a cutter head universally laterally movable over the work, a rotary cutter spindle carried on said cutter head and vertically axially movable thereon, a tracer member carried from the cutter head above and axially alined with the rotary cutter spindle for limiting and determining upward movement of the spindle, a vertically disposed frame spaced from and along a side of the rotary cutter spindle and providing vertical guideways substantially parallel with the spindle, a forming guide holder unit freely vertically movable in said frame guideways, counterbalancing means for said unit, said unit including a horizontally extended forming guide holder for interposition between said tracer member and cutter spindle and for free floating with the vertical movements of the spindle, said tracer member movable to position from above the spindle to enable the forming guide holder being raised to inoperative position above the tracer member, and means operatively coupled with the cutter head concentric with the cutter spindle adjacent the lower end thereof for moving the cutter head and rotary cutter spindle laterally over the work.

13. In an engraving and the like machine, in combination, a supporting frame structure, a work table adjustably supported on the frame structure, a cutter head mounted on and supported from said frame structure for universal lateral movements above and across the work table, a rotary cutter spindle carried by and vertically axially movable on the cutter head, a pattern tracing pantograph supported from the frame structure spaced to one side of the cutter head and disposed in a substantially horizontal plane below the upper end of the cutter spindle, mechanism operatively coupling the pantograph and cutter head for transmission of the pantograph movements to the cutter head to carry the rotary cutter spindle laterally in reproducing the pattern in scaled relation on work secured on the work table, said mechanism supported from the frame structure independently of the pantograph and cutter head, feed mechanism carried by the cutter head above and operatively associated with the rotary cutter spindle at its upper end for vertically feeding said spindle, and freely vertically movable forming guide means supported independently of the cutter head and rotary spindle for removable interposition between the feed mechanism and upper end of the cutter spindle in freely floating operative association therewith to control and define vertical axial movements of the cutter spindle over the work.

14. In combination, a cutter head universally laterally movable over the work, a vertically axially movable cutter assembly carried by the cutter head, means disposed at one side of the cutter head and cutter assembly and operatively coupled with the cutter head for actuating the latter to carry the cutter over the work to reproduce the copy on the work in scaled relation, feed mechanism carried by the cutter head for operative association with and application of vertical feeding force to the upper end of the cutter assembly and forming guide means interposed between the feed mechanism and the upper end of the cutter assembly.

15. In combination, a cutter head, a vertically axially movable cutter assembly carried by the cutter head, feed mechanism carried by the cutter head for operative association with and application of vertical feeding force to the upper end of the cutter assembly, and forming guide means interposed between the feed mechanism and the upper end of the cutter assembly, the cutter assembly and forming guide means mounted for relative lateral movements therebetween.

16. In combination, a cutter head universally laterally movable over the work, a vertically movable cutter assembly carried by the cutter head, feed mechanism carried by the cutter head for operative association with and application of vertical feeding force to the upper end of the cutter assembly, and forming guide means interposed between the feed mechanism and the upper end of the cutter assembly for controlling vertical movement of the cutter assembly on its universal lateral movements over the work.

17. In combination, a cutter head universally laterally movable over the work, a vertically movable cutter assembly mounted on the cutter head, a member above the cutter assembly for limiting vertically upward movement of the assembly, and forming guide means interposed between said member and the upper end of the cutter assembly for engagement thereby to control vertical movements of the cutter assembly on its universal lateral movements over the work.

18. In combination, a cutter head universally laterally movable over the work, a vertically movable cutter assembly mounted on and carried by the cutter head, a vertically adjustable member above the cutter assembly for engagement thereby to limit upward movement of the cutter assembly, and freely vertically floating forming guide interposed between said member and the cutter assembly for operative association with the cutter assembly to control vertical movement thereof on the universal lateral movements of the cutter head and cutter assembly over the work.

19. In combination, a cutter head universally laterally movable over the work, a vertically movable cutter assembly unit mounted in said cutter head, a laterally swingable head carried by the cutter head and extending over and above the cutter assembly to limit upward movement thereof, and said head laterally swingable on the cutter head to position to one side of the cutter assembly for removal of the cutter assembly as a unit from the cutter head.

20. In an engraving and the like machine, a cutter head universally laterally movable over the work, a rotary cutter spindle carried on said cutter head and vertically axially movable thereon, a tracer member above and axially alined with the cutter spindle, a vertically disposed frame spaced from and to one side of the cutter spindle and providing vertically disposed guide ways, a forming guide unit vertically movable in said frame guide ways, said unit including a horizontally extending forming guide holder for interposition between said tracer member and cutter spindle and for floating in operative association with the vertical movements of the spindle, and means operatively coupled with the cutter head for moving the cutter head and cutter spindle laterally over the work.

21. In combination, a cutter head universally laterally movable over the work, a vertically movable cutter assembly mounted on and carried by the cutter head, a tracer member above and substantially alined with the cutter assembly, a vertically movable forming guide interposed between said tracer member and the cutter assembly, and said forming guide having a curved upper surface engaging said tracer member, and an under surface engaged by the upper end of the cutter assembly.

22. In combination, a cutter head universally laterally movable over the work, a vertically movable cutter assembly mounted on and carried by said cutter head, a tracer member above and substantially alined with the cutter assembly, a vertically floating forming guide interposed between the tracer member and the upper end of the cutter assembly and having a curved upper surface, means yieldingly forcing said cutter assembly and forming guide upwardly to maintain the curved upper surface of the forming guide in engagement with the tracer member to control vertical movements of the cutter as it is moved laterally over the work by the cutter head.

23. In combination, a cutter head universally laterally movable over the work, a vertically movable cutter assembly mounted on and carried by said cutter head, a tracer member above and substantially vertically alined with the cutter assembly, a vertically floating forming guide interposed between the tracer member and the upper end of the cutter assembly and having a curved upper surface, means normally yieldingly forcing said cutter assembly and forming guide vertically upwardly to maintain the upper surface of the forming guide engaged with the tracer member to control vertical movements of the cutter as it is moved laterally over the work by the cutter head, and said tracer member vertically adjustable to adjust the operating position of the cutter assembly.

24. In an engraving and the like machine, a cutter head universally laterally movable over the work, a cutter assembly vertically movably mounted on and carried by the cutter head, forming guide means above and operatively associated with the cutter assembly for controlling vertical movements of the cutter assembly as it is moved laterally over the work by the cutter head, a pantograph mechanism for tracing the copy, said pantograph mechanism disposed in a substantially horizontal plane at one side of and spaced from the cutter head and cutter assembly, and mechanism operatively coupling the pantograph with the cutter head and cutter assembly for transmitting movements of the pantograph in scaled relation to the cutter assembly, said movement transmitting mechanism operatively connected with the cutter assembly by a bearing adjacent the lower end of and concentric with the vertical axis of the cutter assembly.

25. In an engraving and the like machine, a cutter head universally laterally movable over the work, a cutter assembly vertically movably mounted on and carried by the cutter head, feed mechanism operatively associated with the upper end of the cutter assembly for adjustably determining the upward movement of said assembly, a pantograph mechanism for tracing the copy, said pantograph mechanism disposed in a substantially horizontal plane at one side of and spaced from the cutter head and cutter assembly, and mechanism operatively connecting the pantograph mechanism with the cutter head for transmitting lateral movements of the pantograph in scaled relation to the cutter assembly, said movement transmitting mechanism operatively connected with the cutter head by a bearing adjacent the lower end of and concentric with the vertical axis of the cutter assembly.

26. In an engraving and the like machine, in combination, a supporting frame structure, a work table adjustably supported on the frame structure, a cutter head mounted on and supported from the frame structure for universal lateral movements across the work table, a cutter spindle carried by and axially movable on the cutter head toward and from the work table, a pattern tracing pantograph supported from the frame structure spaced to one side of the cutter head and disposed in a plane substantially perpendicular to the axis of the cutter spindle, mechanism operatively coupling the pantograph and cutter head for transmission of pantograph movements to the cutter head to carry the cutter spindle laterally in reproducing the pattern in scaled relation on work secured on the work table, said mechanism supported from the frame structure independently of the pantograph and cutter head, and feed mechanism carried by the cutter head and operatively associated with the cutter spindle at its outer end for axially feeding said spindle.

27. In an engraving and the like machine, in combination, a work table, a cutter head universally laterally movable over and across said table, a cutter spindle carried by the cutter head and axially movable thereon toward and from the work table, means carried by the cutter head and operatively associated with the outer end of said spindle for controlling axial movements of the spindle toward and from the work table, and mechanism for moving said cutter head and cutter spindle carried thereby through its universal lateral movements across the work table, said mechanism supported independently of and operatively coupled with the cutter head by a bearing adjacent the inner end of the cutter spindle and concentric with the axis of said spindle.

28. In an engraving and the like machine, in combination, a main frame structure, a cutter and a work holder supported from said main frame and mounted for relative universal lateral movements therebetween during an engraving operation, a pantograph supported from said main frame for tracing a copy to be reproduced, and rectilinear motion mechanism supported from said main frame structure and connected with said pantograph for actuation by the pantograph to transmit the pantograph movements to said relatively universally laterally movable cutter and work holder in scaled relation to a copy being traced by the pantograph.

29. In an engraving and the like machine, in combination, a main frame structure, a cutter and a work holder supported from said main frame and mounted for relative universal lateral movements therebetween on curved and/or straight lines during an engraving operation; and means for controlling the relative lateral movements between said cutter and said work holder, said means including rectilinear motion mechanism embodying slides supported from said main frame and movable endwise in straight lines perpendicular to each other, one slide actuating the other slide on its straight line endwise movement with respect to the other slide, and a pantograph for tracing a copy operatively coupled to the aforesaid one slide to actuate said slides, said rectilinear motion mechanism transmitting the pantograph movements in scaled relation to the copy being traced to said relatively universally laterally movable cutter and work holder.

30. In an engraving and the like machine, in combination, a main frame structure, a support on said main frame, a pantograph pivotally carried by said support and provided with a block for transmitting the scaled motion generated by the pantograph, rectilinear motion mechanism coupled to and actuated by said block to transmit the lateral movements of said block by relatively perpendicular straight line movements, a cutter head supported from said main frame and universally movable laterally in one plane, said cutter head provided with a rotary driving spindle for a rotary cutter, the axis of said spindle being perpendicular to said plane in which the head is movable, and said rectilinear motion mechanism having a bearing concentric with the axis of said spindle and in which said cutter head is mounted, whereby said cutter head is actuated on its lateral movement by said rectilinear motion.

31. In an engraving and the like machine, in combination, a main frame structure; a cutter head supported on said main frame for universal lateral movements; a laterally movable pantograph supported from said main frame; and a rectilinear motion mechanism supported from said main frame and interposed between the pantograph and the cutter head to transmit the scaled lateral movements of the pantograph to said cutter head to actuate the latter on its lateral movements, said rectilinear motion mechanism including an endwise movable slide confined to straight-line reciprocation and to bodily lateral reciprocation in a line perpendicular to its line of endwise reciprocation, said slide having the pantograph directly operatively coupled thereto and also having the cutter head directly operatively coupled thereto.

32. In an engraving and the like machine, in combination, a main frame structure, a cutter head universally laterally movable over the work, supporting means on said main frame for carrying the cutter head on its lateral movements, a pantograph mechanism supported from said main frame for tracing a copy, said pantograph spaced from said cutter head and its supporting means, and motion transmitting mechanism supported from said main frame and operatively coupling the cutter head with said pantograph for transmitting the pantograph movements to and moving the cutter head through its universal lateral movements in scaled relation to a copy being traced by the pantograph.

GEORGE GORTON.
PETER M. HENKES.